(12) United States Patent
Tanida

(10) Patent No.: US 8,225,055 B2  
(45) Date of Patent: Jul. 17, 2012

(54) DATA BACKUP SYSTEM, DATA BACKUP PROGRAM, DATA RESTORATION PROCESSING SYSTEM, AND DATA RESTORATION PROCESSING PROGRAM

(75) Inventor: Mio Tanida, Hiratsuka (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 843 days.

(21) Appl. No.: 11/025,035

(22) Filed: Dec. 30, 2004

(65) Prior Publication Data

US 2006/0066890 A1  Mar. 30, 2006

(30) Foreign Application Priority Data

Sep. 30, 2004 (JP) ................ 2004-288272

(51) Int. Cl.  
G06F 12/00 (2006.01)  
G06F 7/00 (2006.01)  
(52) U.S. Cl. ............ 711/162; 711/E12.103; 707/674  
(58) Field of Classification Search ............ 358/1.16, 358/116; 711/162  
See application file for complete search history.

(56) References Cited

U.S. PATENT DOCUMENTS

| 6,085,298 A * | 7/2000 | Ohran ............ 711/162 |
| 2001/0024518 A1* | 9/2001 | Yaguchi ............ 382/170 |
| 2005/0002057 A1* | 1/2005 | Oe ............ 358/1.15 |
| 2005/0253554 A1* | 11/2005 | DiFazio et al. ............ 320/114 |
| 2006/0053179 A1* | 3/2006 | Imaizumi et al. ............ 707/204 |

FOREIGN PATENT DOCUMENTS

| JP | 11-196212 | 7/1999 |
| JP | 2000-163352 | 6/2000 |
| JP | 2003-173243 | 6/2003 |
| JP | 2003-216395 | 7/2003 |
| JP | 2004-086764 | 3/2004 |
| JP | 2004-151703 | 5/2004 |

OTHER PUBLICATIONS

Notification of Reasons for Refusal, dated Nov. 27, 2007, issued in corresponding Japanese Patent Application No. 2004-288272, and translation thereof.

* cited by examiner

Primary Examiner — Kevin Ellis  
Assistant Examiner — Aracelis Ruiz  
(74) Attorney, Agent, or Firm — Buchanan Ingersoll & Rooney PC

(57) ABSTRACT

A data backup system includes an administration device built in an image forming apparatus for administering a state of usage of the image forming apparatus every administrative unit of a previously registered user and/or organization, and a backup device for acquiring registration data of the administrative unit and the data of the activities as backup data.

10 Claims, 5 Drawing Sheets

| Types of counters | | User 1 | User 2 | User 3 | ...... | User X | Department 1 | Department 2 | Department 3 | ...... | Department Y | PUBLIC user | Box administrator |
|---|---|---|---|---|---|---|---|---|---|---|---|---|---|
| Total counter (copy+printer+FAX+scanner) | Total | 123 | 12 | 99 | | 654 | 48 | 33 | 9987 | | 493 | 94 | 30 |
| | Full color | 234 | 33 | 74 | | 39 | 654 | | 1875 | | 75 | 40 | 40 |
| | Black | 345 | 2 | 94 | | 48 | 345 | 74 | 456 | | 35 | 30 | 30 |
| | Mono color | 234 | 75 | 40 | | 26 | 74 | 94 | 5 | | 74 | 43 | 43 |
| | Two colors | 22 | 35 | 30 | | 2 | 93 | 48 | 33 | | 94 | 69 | 69 |
| Copy total counter | Total | 33 | 74 | 30 | | 4813 | 493 | 30 | 45 | | 40 | 654 | 654 |
| | Full color | 2 | 94 | 30 | | 833 | 345 | 43 | | | 30 | 345 | 345 |
| | Black | 75 | 40 | 40 | | 3234 | 654 | 40 | 40 | | 654 | 74 | 30 |
| | Mono color | 35 | 30 | 30 | | 345 | 345 | 30 | 30 | | 64 | 345 | 345 |
| | Two colors | 74 | 43 | 43 | | 654 | 654 | 43 | 43 | | 4 | 654 | 654 |
| Copy large size counter | Total | 94 | 69 | 69 | | 345 | 26 | 69 | 69 | | 78 | 345 | 26 |
| | Full color | 40 | 654 | 654 | | 654 | 22 | 654 | 654 | | 654 | 654 | 22 |
| | Black | 30 | 345 | 345 | | 457 | 33 | 345 | 345 | | 26 | 69 | 69 |
| | Mono color | 43 | 74 | 74 | | 654 | 48 | 74 | 74 | | 22 | 654 | 654 |
| | Two colors | 69 | 93 | 234 | | 40 | 40 | 93 | 234 | | 33 | 345 | 345 |
| Printer total counter | Total | 345 | 39 | 22 | | 30 | 30 | 39 | 345 | | 48 | 74 | 74 |
| | Full color | 654 | 48 | 33 | | 43 | 43 | 48 | 654 | | 40 | 93 | 234 |
| | Black | 345 | 26 | 2 | | 69 | 69 | 26 | 345 | | 30 | 39 | 22 |
| | Mono color | 654 | 22 | 75 | | 654 | 654 | 22 | 654 | | 43 | 48 | 33 |
| | Two colors | 457 | 33 | 35 | | 345 | 345 | 33 | 69 | | 69 | 26 | 2 |
| Printer large size counter | Total | 654 | 48 | 33 | | 654 | 654 | 48 | 654 | | 654 | 22 | 75 |
| | Full color | 654 | 75 | 94 | | 26 | 69 | 26 | 345 | | 345 | 33 | 35 |
| | Black | 36 | 35 | 40 | | 234 | 26 | 74 | 654 | | 43 | 74 | 74 |
| | Mono color | 36 | 74 | 30 | | 654 | 48 | 33 | 93 | | 69 | 93 | 234 |
| | Two colors | 654 | 94 | 654 | | 36 | 75 | 94 | 39 | | 345 | 39 | 22 |
| Scanner counter | large size | 345 | 40 | 345 | | | 35 | 40 | 48 | | 654 | 48 | 33 |
| | small size | 74 | 40 | | | 36 | | 30 | 26 | | 345 | 26 | 2 |
| Scanner/FAX reading counter | | 93 | | 654 | | 654 | 74 | 30 | 22 | | 654 | 22 | 75 |
| Scanner/FAX reading large size counter | | 39 | | 457 | | 64 | | 345 | 33 | | 457 | 33 | 35 |
| Scanner/FAX print counter | | 48 | | 654 | | 4 | 345 | 654 | 74 | | 654 | 48 | 33 |
| Scanner/FAX large size print counter | | 26 | | 75 | | 78 | 345 | 26 | 93 | | 36 | 75 | 94 |
| FAX transmission number counter | | 2 | | 35 | | 654 | 654 | 22 | 39 | | 36 | 35 | 40 |
| Counter for each size | | 4 | | 74 | | 45789 | 457 | 33 | 435 | | 74 | 74 | 654 |
| Both-sided counter | | 833 | 813 | 94 | | 8546 | 654 | 48 | 249 | | 333 | 234 | 345 |
| Original number counter | | 493 | 493 | 94 | | 65 | | | 852 | | | | |
| Paper number counter | | | | | | | | | | | | | |

FIG.4

DATA BACKUP SYSTEM, DATA BACKUP PROGRAM, DATA RESTORATION PROCESSING SYSTEM, AND DATA RESTORATION PROCESSING PROGRAM

This application claims priority under 35 U.S.C. §119 to Japanese Patent Application No. 2004-288272 filed on Sep. 30, 2004, the entire disclosure of which is incorporated herein by reference in its entirety.

BACKGROUND OF THE INVENTION

1. Field of the Invention

The present invention relates to a data backup system, a data backup program, a data restoration processing system and a data restoration processing program, which are used for changing setting of an image forming apparatus, or for restoring setting to its previous setting in a system for administering a state of usage of an image forming apparatus.

2. Description of the Related Art

The following description sets forth the inventor's knowledge of related art and problems therein and should not be construed as an admission of knowledge in the prior art.

In image forming apparatuses, such as MFPs (Multi Function Peripherals: multifunctional digital copying machine) or printers, shared by a plurality of users, an image forming apparatus capable of administering the number of copies made by or the number of prints used by each user or department to which the user belongs is know by, for example, Japanese Unexamined laid-open Patent Publication Nos. 2000-163352 and 2003-216395. In the image forming apparatus, it is configured such that user names and/or department names are registered and an authorization code is given to each user and/or department and the total member of usage (accounting information) of each user and/or department can be stored by obtaining authentication at the time of the usage in order to manage the number of copies made by and the number of prints used by each user and/or each department to which the user belongs.

By the way, in such image forming apparatus, it is sometimes required to change once registered user/department registrations in accordance with an increase and decrease of users or reorganization of a department.

In particular, in image forming apparatuses, in order to store the accumulation number of usage of each user or department, the memory capacity has to be large, while the memorizable storage area is limited.

In the meantime, user or department registration changing operations may sometimes result in failure during the registration changing operations. Furthermore, an administrator may sometimes wish to restore contents of the changed setting to the contents of the previous setting. In such cases, it is necessary to immediately restore the changed contents on users or departments or the state of usage of the image forming apparatus to its previous contents or states. However, there was no proposal regarding such restoration.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a data backup system capable of restoring, for example, registered contents of users and/or departments or a state of usage of an image forming apparatus to their previous contents or state.

Among other potential advantages, some embodiments can provide a backup program for making a computer perform data backup processing.

Among other potential advantages, some embodiments can provide a data restoration processing system capable of restoring, for example, registered contents of users and/or departments or a state of usage of an image forming apparatus to their previous contents or state.

Among other potential advantages, some embodiments can provide a restoration processing program for making a computer perform data restoration processing.

According to a first aspect of the preferred embodiment of the present invention, a data backup system, comprises:

an administration device built in an image forming apparatus, wherein the administration device administers a state of usage of the image forming apparatus every administrative unit of registered users and/or organizations; and a backup device for acquiring registration data of the administrative unit and data of the state of usage as backup data.

According to a second aspect of the preferred embodiment of the present invention, a data backup program on a computer-readable medium, which operates to make a computer execute processing for acquiring data with respect to a system equipped with an administrative device built in an image forming apparatus, comprises the steps of:

requesting a request signal to the image forming apparatus;

acquiring registration data of an administrative unit and data of a state of usage as backup data, replied to the request signal; and storing the backup data in a memory.

According to a third aspect of the preferred embodiment of the present invention, a data backup system, comprises:

an image forming apparatus:

an administration device, wherein the administration device administers a state of usage of the image forming apparatus every administrative unit of registered users and/or organizations;

a backup device for acquiring registration data of the administrative unit and data of the state of usage as backup data; and a restoration device for restoring the system by writing the backup data acquired with the backup device in the system after acquisition of the backup data, wherein the restoration device is provided with an acquisition portion for acquiring data of a newest state of usage, and a comparator for comparing the data of the newest state of usage with the backup data acquired with the backup device, and wherein, in cases where the data of the newest state of usage differs from the backup data, the data of the newest state of usage is written in the system.

According to a fourth aspect of the preferred embodiment of the present invention, a data restoration processing program on a computer-readable medium, which operates to make a computer execute the steps of:

acquiring registration data of administrative units of registered users and/or organizations and data of a state of usage of an image forming apparatus as backup data with respect to a system equipped with an administration device of an image forming apparatus, wherein the administration device administers the state of usage of the image forming apparatus every administrative unit of registered users and/or organizations;

acquiring data of the newest state of usage at the time of restoring the system by writing the backup data therein;

comparing the acquired data of the newest state of usage with backup data; and writing the data of the newest state of usage when the data of the newest state of usage is different from the backup data as a result of comparison.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 4 is a table showing an example of counter information;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
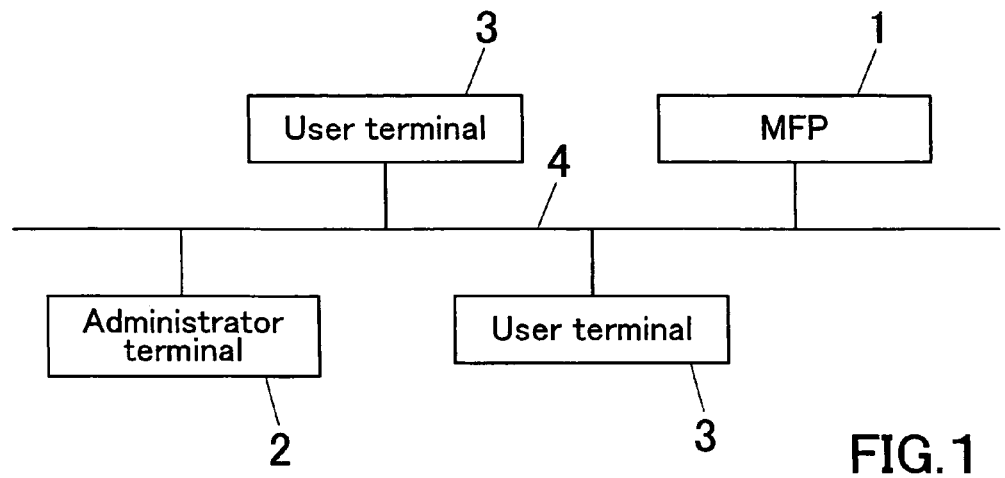
FIG. 1 is a block diagram showing a structure of a network system in which an administrator terminal for executing a restoration processing program for backup data according to one embodiment of the present invention and a MFP as an image forming apparatus are connected.

FIG. 1 is a block diagram showing a system in which a MFP 1 as an image forming apparatus, an administrator terminal 2 consisting of a personal computer or the like for executing a backup data program or a restoration processing program for backup data according to one embodiment of the present invention and a user terminals 3 and 3 using the MFP 1 as a common printer are connected via a network 4.

Figure 2:
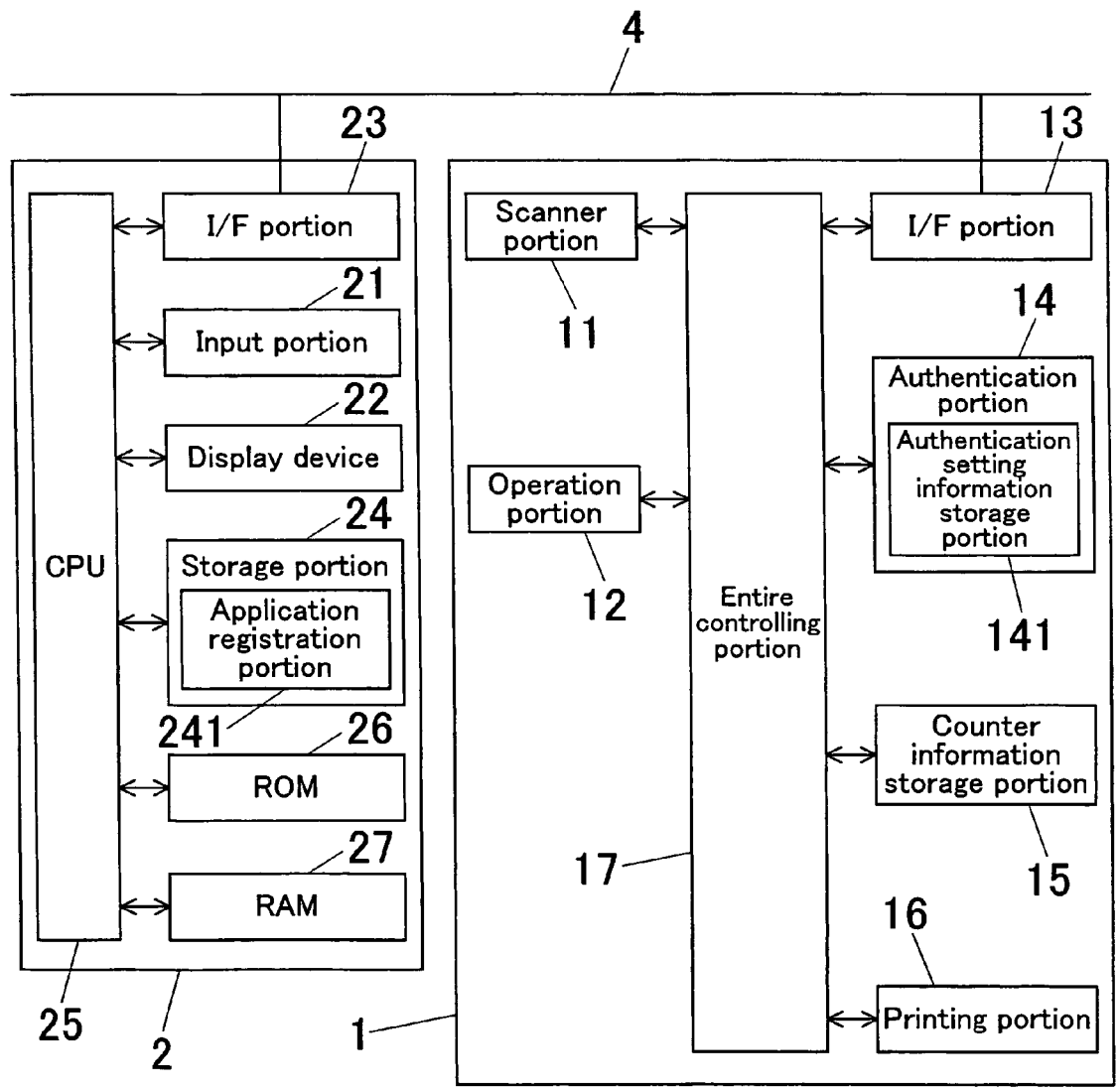
FIG. 2 is a block diagram functionally showing internal configurations of the image forming apparatus and the administrator terminal shown in FIG. 1.

The MFP 1 has a function as an administration device for administering the state of usage thereof. As shown in FIG. 2, the MFP 1 is provided with a scanner portion 11, an operation portion 12, an interface portion 13 (shown as "I/F portion" in FIG. 2), an authentication portion 14, a counter information storage portion 15, a printing portion 16, and an entire controlling portion 17.

The scanner portion 11 is a portion for reading an original document set by a user by scanning the document.

The operation portion 12 is used by a user to input data and/or instructions, and is provided with a touch-sensitive display panel and various keys, e.g., a start key, a stop key and a ten key.

The interface portion 13 functions as a transmitting and receiving portion for communicating with the administrator terminal 2 and/or the user terminals 3 and 3.

The authentication portion 14 discriminates whether an inputted user ID and/or password are correct at the time of logging in by an authentication target user or a user belonging to an authentication target department.

In this embodiment, the authentication portion 14 is formed in the form of an internal server of the MFP 1. However, in place of the internal server of the MFP 1, it can be configured such that an exclusive external authentication server is connected to the network 4 so that the external authentication server can execute authentication at the time of using the MFP 1.

The authentication portion 14 is equipped with an authentication setting information storage portion 141, so that current authentication setting information including information about authentication target users and/or departments can be stored.

The counter information storage portion 15 stores various kinds of counter information as account data in an updatable manner with the counter information related to authentication target users or departments, or publics users who are non-authentication target users.

The printing portion 16 outputs original document data read with the scanner portion 11 or print data sent from the user terminal 3, etc., on a paper.

The entire controlling portion 17 controls the entire MFP 1. The entire controlling portion executes, for example, user instructions inputted from the operation portion 12, makes the authentication portion 14 discriminate whether the inputted authentication is correct, or updates predetermined counter information stored in the counter information storage portion 15 every time a user uses the MFP 1. Furthermore, the controlling portion 17 makes the printing portion 16 print original document data read with the scanner portion 11 or the aforementioned print data, or reads and then transmits the current authentication setting information stored in the authentication setting information storage portion 141 or counter information stored in the counter information storage portion 15 in accordance with an instruction from the administrator terminal 2, which will be mentioned later. The controlling portion 17 also writes backup data transmitted from the administrator terminal 2 in the authentication setting information storage portion 141 or the counter information storage portion 15.

Namely, the entire controlling portion 17 also has a function as an administration device for administering counter information (information on the number of image forming) which is the state of usage of the MFP 1 every administrative unit, i.e., every user or department registered in the authentication setting information storage portion 141, or every entire public user that no authentication is set.

The entire controlling portion 17 is constituted by a computer system including a CPU, a ROM and a RAM.

In this embodiment, the MFP 1 cannot accept a lock request for prohibiting an usage (e.g., print, scan, copy) accompanied by updating of account data from the administrator terminal 2, in other words, it cannot prohibit a usage accompanied by updating of account data.

The administrator terminal 2 functions as a backup device for acquiring authentication setting information of the MFP 1 and counter information which is data of a state of usage thereof as backup data, and also functions as a restoration device for restoring data to acquired backup data when required. This administrator terminal 2 is provided with an input portion 21, a display device 22, an interface portion 23 (shown as "I/F portion" in FIG. 2), a storage portion 24, a CPU 25, a ROM 26 and a RAM 27.

The input portion 21 includes a keyboard, a mouse, etc., and the display device 22 is comprised of a liquid crystal display, a CRT, or the like.

The interface portion 23 functions as a transmitting and receiving portion for performing a communication with the MFP 1 and/or the user terminals 3 and 3.

The storage portion 24 is comprised of, e.g., a hard disk, and stores current authentication setting information stored in the authentication setting information storage portion 141 of the MFP 1 or counter information stored in the counter information storage portion 15 as backup data. It also stores various kinds of data, programs, etc. In this embodiment, the storage portion 24 is provided with an application registration portion 241. In this application registration portion 241, a backup program to be executed at the time of acquiring the backup data from the MFP 1, a restoration processing program for backup data to be executed at the time of restoring the acquired backup data to the previous data, etc., are stored.

The CPU 25 controls the entire administrator terminal 2 by being operated in accordance with the program stored in the ROM 26 or the program registered in the application registration portion 241.

The CPU 25 has a function of acquiring the newest counter information from the MFP 1, comparing the acquired counter information with backup data, and writing the newest counter information if the acquired counter information is different from the backup data and writing the backup data if the acquired counter information is the same as the backup data at the time of restoring backup data to the MFP 1.

The ROM 26 stores a program and required data, and the RAM 27 functions as a working area when the CPU 25 executes programs.

Figure 3:
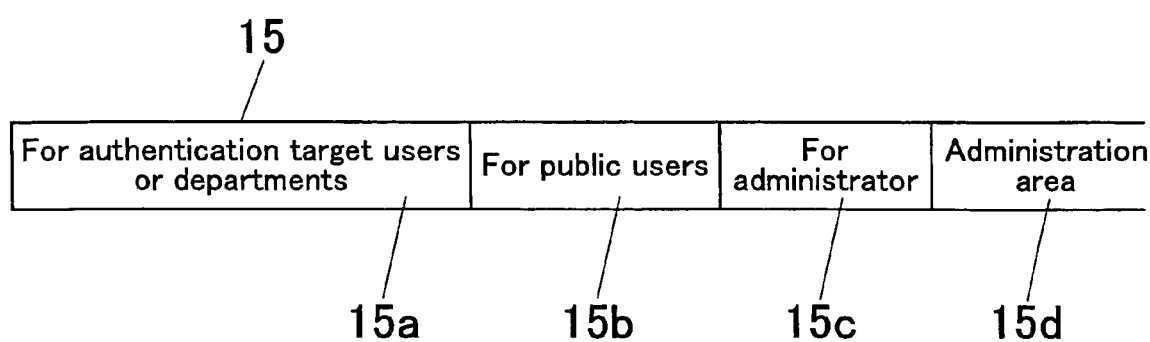
FIG. 3 is an explanatory view showing an area of a counter information storage portion.

FIG. 3 is an explanatory view showing memory areas of the counter information storage portion 15 of the MFP 1.

The counter information storage portion 15 has several memory areas including a first area 15a for storing various kinds of counter information on the usage of authentication target users and departments, a second area 15b for storing various kinds of counter information on the usage of non-authentication target public users, a third area 15c for storing counter information on the usage of an administrator, and an administration area 15d storing a total value of counter information. It is configured such that the contents of the first area 15a can be erased by being overwritten with new setting when a change of authentication setting accompanied by a change of authentication target is performed.

FIG. 4 is a table showing an example of counter information stored in the first area 15a to third area 15c of the counter information storage portion 15.

In this embodiment, authentication target users are User 1 to User X, authentication target departments are Department 1 to Department Y. As for counter items, there are various items including, e.g., a copy counter (black and white/full color/two colors), a copy large size counter (black and white/full color/two colors), a printer counter (black and white/full color/two colors), a printer large size counter (black and white/full color/2 color), a scanning counter, and a scanning large size counter, an original document number counter, a paper number counter, and counters for each size. In each item, a predetermined counter value is added every time a user uses.

Counter information of the authentication target users and departments shown in FIG. 4 is stored in the first area 15a of the counter information storage portion 15, counter information of public users is stored in the second area 15b, and counter information of the administrator is stored in the third area 15c. Each counter information is updated every time the MFP 1 is used. Although not shown in the table of FIG. 4, the total value of each counter information is stored in the administration area 15d of the counter information storage portion 15.

The following explanation will be directed to the case in which authentication setting currently registered in the authentication setting information storage portion 141 of the authentication portion 14 of the MFP 1 is changed.

Here, it is assumed that the MFP 1 shown in FIG. 1 can set following authentication setting.

(1) User authentication whose authentication target is a user (MFP 1 makes the internal server of image forming apparatus authenticate)
(2) User authentication whose authentication target is a user (MFP 1 makes a server of the image forming apparatus exterior authenticate)
(3) Department authentication whose authentication target is a department (authentication is performed by using a name and a password)
(4) Department authentication whose authentication target is a department (MFP 1 authentication is performed by using a password only)
(5) User/department authentication whose authentication targets are a user and a department (MFP 1 makes the internal server of image forming apparatus authenticate)
(6) User/department authentication whose authentication targets are a user and a department (MFP 1 makes an external server of the image forming apparatus)

In cases where any one of the aforementioned six authentication settings is employed in the MFP 1, at the time of changing the authentication setting into another authentication setting, the administrator terminal 2 acquires, as backup data, the current authentication setting information stored in the authentication setting information storage portion 141 and the current counter information stored in the counter information storage portion 15.

Furthermore, in the case of changing the setting rate when users and departments are set as authentication targets, the administrator terminal 2 also acquires, as backup data, the current authentication setting information registered in the authentication setting information storage portion 141 (for example, information on authentication target users or departments, administration area allocation information), the current counter information stored in the counter information storage portion 15.

For example, in cases where the number of authentication targets that can be stored in the first area 15a of the counter information storage portion 15 is 1000 and 800 and 200 are assigned to users and departments respectively, if the respective assigned numbers are changed into 900 and 100, respectively, it is not necessary to acquire all of authentication setting information as backup data. Only a part of setting information related to the change may be acquired.

Figure 5:
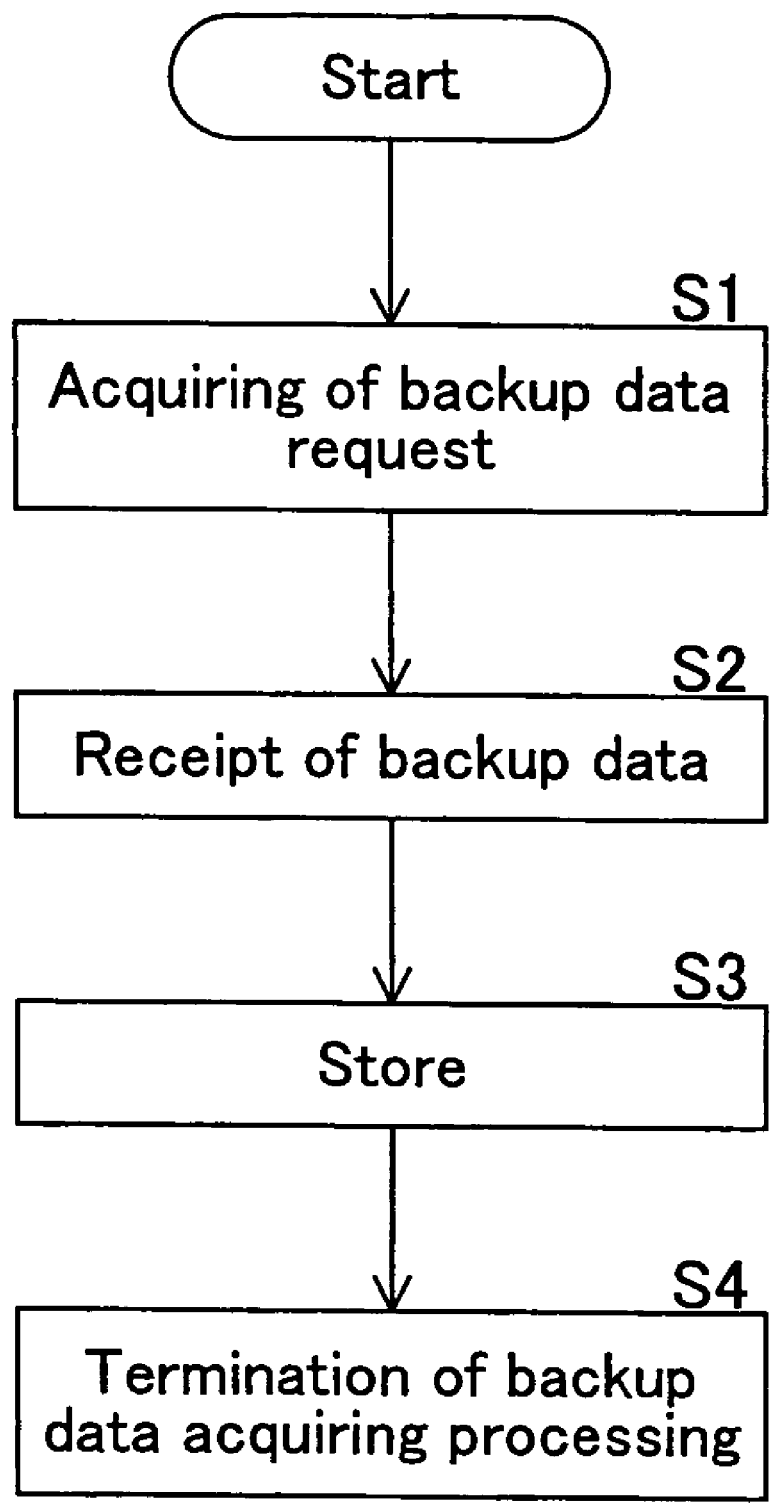
FIG. 5 is a flowchart showing procedures for executing an acquisition processing program for backup data.

FIG. 5 is a flowchart showing the contents of processing that the CPU 25 performs when the administrator terminal 2 acquires backup data. This processing is performed by executing the program stored in the application registration portion 241 by the CPU 25 of the administrator terminal 2.

In the following explanation and drawings, "step" will be abbreviated as "S."

At S1, an acquisition request of backup data is issued to the MFP 1. Upon receipt of this request, the MFP 1 reads the current authentication setting information registered in the authentication setting information storage portion 141 and the current counter information stored in the counter information storage portion 15, and then transmits them to the administrator terminal 2.

At S2, the administrator terminal 2 receives the data transmitted from the MFP 1, stores the data in the storage portion 24 at S3, and then terminates the processing at S4.

After the acquisition of such backup data, authentication setting change is performed by the administrator terminal 2 if desired. However, the setting change might sometimes result in failure (due to, e.g., disconnection of a network cable, or abnormal termination by unintentionally turning the power supply off), or the administrator of the image forming apparatus may wish to return the changed setting to the setting of the backup time.

In this case, the acquired backup data is again written in the authentication setting information storage portion 141 or the counter information storage portion 15.

However, since the MFP 1 cannot prohibit the activity accompanied by updating of accounting information as mentioned above, if a print request, etc., is issued from a user terminal 3 after acquisition of backup data, the print activity is performed by the MFP 1, and therefore corresponding counter information will be updated depending on the print activity.

However, if counter information is updated after the backup, the counter information at the time of backup and the newest current counter information do not coincide.

In view of the above problems, in this embodiment, the following processing is performed at the time of returning the changed authentication setting to the authentication setting at the time of backup at the administrator terminal 2.

Figure 6:
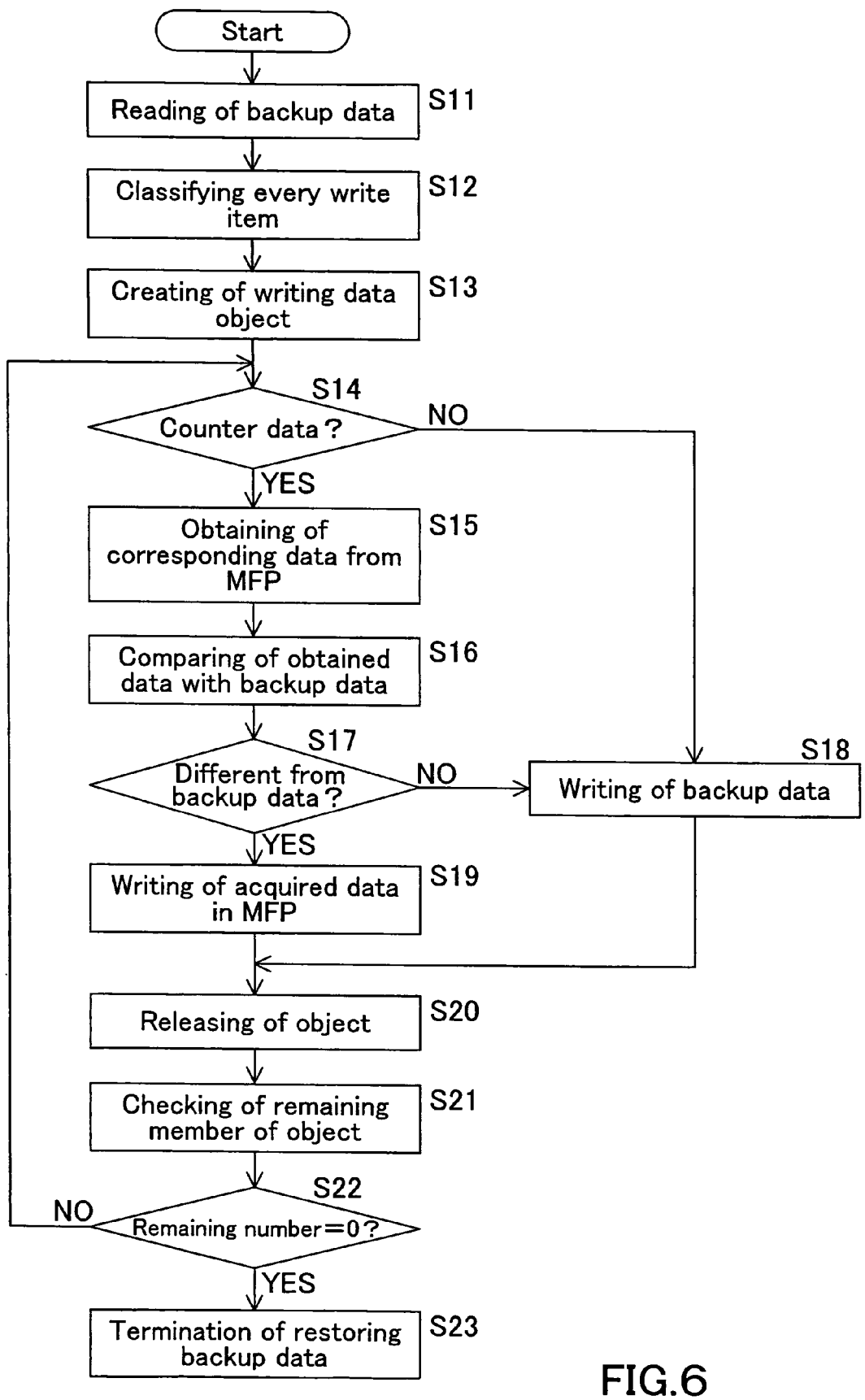
FIG. 6 is a flowchart showing procedures for executing a restoration processing program for backup data.

FIG. 6 is a flowchart showing the contents of processing that the CPU 25 of the administrator terminal 2 performs at the time of restoring the authentication setting using backup data. As explained above, this processing is performed by executing the program registered in the application registration portion 241 by the CPU 25 of the administrator terminal 2.

At S11, the CPU 25 reads out the backup data which was already acquired and stored in the storage portion 24 from the storage portion 24, and then classifies the read backup data into respective write items at S12. Thereafter, at S13, the CPU 25 creates writing data object (units of every data).

Next, at S14, it is discriminated whether the object data is counter information (shown as "counter data" in FIG. 6) for every object.

If it is discriminated that the initial object data is counter information ("Yes" at S14), at S15, the corresponding counter information is acquired from the counter information storage portion 15 of the MFP 1, and then the routine proceeds to S16. This counter information is the newest counter information.

At S14, if the object data is not counter information ("No" at S14), since it means that the data is authentication setting information, at S18, the backup data is written to the authentication setting information storage portion 141 via the entire controlling portion 17 of the MFP 1. Thereafter, the routine proceeds to S20.

On the other hand, at S16, the acquired newest counter information is compared with backup data, and it is discriminated whether the acquired newest counter information differs from the counter information included in the backup data.

If it differs from the acquired counter information ("Yes" at S17), at S19, the acquired counter information is written to an area intended to write the counter information and located in the counter information storage portion 15 of the MFP 1, and then the routine proceeds to S20. To the contrary, if it is the same as the acquired counter information ("No" at S20), since it means that updating of counter information is not performed, at S18, backup data is written to an area intended to write the backup data and located in the counter information storage portion 15 of the MFP 1. Then, the routine proceeds to S20.

In the aforementioned S17, the reasons why the acquired counter information is written in the counter information storage portion 15 of the MFP 1 without making the newest counter information stored in the counter information storage portion 15 remain as it is in cases where backup data differs from the acquired counter information are as follows.

That is, if it is possible to rewrite only a part of counter information, there is a possibility that counter information can be rewritten freely. Accordingly, a system in which rewriting does not become effective without rewriting all of the counter information at the time of rewriting counter information is employed.

At S20, the object whose processing was finished is released. Then at S21, the remaining number of objects to be discriminated whether it is counter information is checked. At S22, it is discriminated whether the remaining number is 0 (zero).

If the remaining number is not 0 (zero) ("No" at S22), the routine returns to S14 to repeat the processing of S14 to S21 on the next object.

At S22, if the remaining number of the object is 0 (zero) ("Yes" at S22), since judgment was performed about all of objects, at S13, the restoration processing of backup data is terminated.

In the state where backup data is written in the MFP 1, the authentication setting information at the time of backup is stored in the authentication setting information storage portion 141 of the authentication portion 14, and the newest counter information is stored in the counter information storage portion 15. For this reason, it becomes possible to avoid an inconvenience that the counter information returns to the information at the time of backup.

Although a preferable embodiment of the present invention is explained above, the present invention is not limited to the above embodiment. For example, in the aforementioned embodiment, the administrator terminal 2 executes the acquisition processing program for backup data and the restoration processing program for backup data as well. It can be configured such that the MFP 1 itself is provided with a storing portion for storing execution functions of an acquisition processing program or a restoration processing program and acquired backup data so that an administrator can operate at the operation portion 12 of the MFP 1.

As for counter information, although the newest counter information is written in the above embodiment, backup data can be written as it is.

As mentioned above, an external authentication server can be provided independent from the MFP 1.

Furthermore, in the above embodiment, as for counter information of users other than authentication target users as well as counter information on authentication target users or departments, backup data is compared with the newest counter information. However, the present invention can also be applied to an image forming apparatus which permits only the use of authentication target users or departments and prohibits the use of users other than authentication target users.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. A data backup system, comprising:
an image forming apparatus;
an administration device, wherein the administration device administers a state of usage of the image forming apparatus for every administrative unit of registered users or organizations;
a backup device, wherein the backup device acquires registration data for each of the administrative units and data of the state of usage; and
a restoration device
provided with an acquisition portion which acquires data of a newest state of usage from the administration device at the time of restoration, when the restoration device restores the system, and a comparator which compares the data of the newest state of usage with the data of the state of usage acquired by the backup device, and wherein, in cases where the data of the newest state of usage differs from the data of the state of usage acquired by the backup device, the restoration device writes data of the newest state of usage in the administration device.

2. The data backup system as recited in claim 1, wherein the restoration device writes the data acquired by the backup device if the data of the newest state of usage coincides with the data acquired by the backup device.

3. The data backup system as recited in claim 1, further comprising an authentication device for authenticating users or organizations, wherein the state of usage is a state of usage of authenticated users or/and organizations.

4. The data backup system as recited in claim 1, wherein the state of usage is the number of images formed.

5. The data backup system as recited in claim 1, wherein the image forming apparatus does not have a function of prohibiting a usage accompanied by updating of the state of usage.

6. A nontransitory computer-readable medium storing a data restoration processing program for making a computer execute the steps of:
acquiring backup data that includes registration data of administrative units of registered users or organizations and data of a state of usage of users and organizations using the image forming apparatus with respect to a system equipped with an administration device of an image forming apparatus,
wherein the administration device administers the state of usage of the image forming apparatus for every administrative unit of registered users or organizations;
acquiring data of the newest state of usage from the administration device at the time of restoring the system by writing the backup data therein;
comparing the acquired data of the newest state of usage with the data of the state of usage of the backup data; and
writing the data of the newest state of usage in the administration device when the data of the newest state of usage is different from the data of the state of usage of the backup data.

7. The nontransitory computer-readable medium as recited in claim 6, wherein at the step of writing the data, the backup data is written if the data of the newest state of usage and the backup data are the same.

8. The nontransitory computer-readable medium as recited in claim 6, further comprising an authentication device for authenticating user and organizations, wherein the state of usage is a state of usage of authenticated users and organizations.

9. The nontransitory computer-readable medium as recited in claim 6, wherein the state of usage is the number of images formed.

10. The nontransitory computer-readable medium as recited in claim 6, wherein the image forming apparatus does not have a function of prohibiting an activity accompanied by updating of the state of usage.

* * * * *